United States Patent
Kesavan et al.

(10) Patent No.: US 11,150,892 B2
(45) Date of Patent: Oct. 19, 2021

(54) SOFTWARE VERSIONING FOR NETWORK CONNECTED DEVICES

(71) Applicant: Microsoft Technology Licensing, LLC, Redmond, WA (US)

(72) Inventors: Madhavan Kesavan, Redmond, WA (US); Kun Cong, Sammamish, WA (US); Brian Robert Crawford, Seattle, WA (US); Zhenyu Guo, Bellevue, WA (US); Arun Ramadasan Mannengal, Sammamish, WA (US); Christopher Samuel Green, Redmond, WA (US); Ritesh Rao, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 91 days.

(21) Appl. No.: 16/597,763

(22) Filed: Oct. 9, 2019

(65) Prior Publication Data

US 2021/0034357 A1     Feb. 4, 2021

Related U.S. Application Data

(60) Provisional application No. 62/880,599, filed on Jul. 30, 2019.

(51) Int. Cl.
*G06F 9/44* (2018.01)
*G06F 8/658* (2018.01)
(Continued)

(52) U.S. Cl.
CPC ............ *G06F 8/658* (2018.02); *G06F 8/71* (2013.01); *G06F 11/1433* (2013.01); *G06F 11/3013* (2013.01)

(58) Field of Classification Search
None
See application file for complete search history.

(56) References Cited

U.S. PATENT DOCUMENTS 8,301,910 B2 * 10/2012 Perepa ................... G06F 21/12
713/193
2005/0038875 A1    2/2005 Park
(Continued)

OTHER PUBLICATIONS

"AWS IoT Things Graph Console", Retrieved from: https://docs.aws.amazon.com/thingsgraph/latest/ug/amazon-things-graph.pdf, Retrieved Date: Aug. 19, 2019, 286 Pages.
(Continued)

*Primary Examiner* — Anna C Deng
(74) *Attorney, Agent, or Firm* — Alleman Hall Creasman & Tuttle LLP

(57) ABSTRACT

A computing system includes a logic subsystem and memory storing instructions executable by the logic subsystem. The instructions are executable by the logic subsystem to store, in the memory, a plurality of software models that each describe aspects of a network connected device or a software service, the plurality of software models comprising a first version of a selected software model. The logic subsystem is configured to receive a second version of the selected software model and validate the second version of the selected software model via validation logic by applying one or more versioning rules to the second version of the selected software model. Based on the application of the one or more versioning rules, the logic subsystem is configured to execute a versioning action on the selected software model.

14 Claims, 11 Drawing Sheets

(51) Int. Cl.
    *G06F 8/71*     (2018.01)
    *G06F 11/14*     (2006.01)
    *G06F 11/30*     (2006.01)

(56) References Cited

U.S. PATENT DOCUMENTS

| | | | |
|---|---|---|---|
| 2005/0288897 A1* | 12/2005 | Archer | G06Q 50/30 702/183 |
| 2006/0130048 A1* | 6/2006 | Ho | G06F 11/3664 717/170 |
| 2010/0191690 A1 | 7/2010 | Bitonti et al. | |
| 2013/0074197 A1* | 3/2013 | Shelton | G06F 21/125 726/28 |
| 2014/0007184 A1 | 1/2014 | Porras | |
| 2017/0006595 A1 | 1/2017 | Zakaria et al. | |
| 2017/0026488 A1 | 1/2017 | Hao et al. | |
| 2017/0123389 A1 | 5/2017 | Baez et al. | |
| 2017/0374155 A1 | 12/2017 | Chen | |
| 2020/0201615 A1* | 6/2020 | Biswas | G06F 8/61 |

OTHER PUBLICATIONS

Green, Chris, "Digital Twin Definition Language", Retrieved from: https://web.archive.org/web/20190507154644/https:/github.com/Azure/IoTPlugandPlay/tree/master/DTDL, May 7, 2019, 27 Pages.

Provost, Peter, "Build with Azure IoT Central and IoT Plug and Play", Retrieved from: https://azure.microsoft.com/en-in/blog/build-with-azure-iot-central-and-iot-plug-and-play/, May 7, 2019, 10 Pages.

Betts, et al, "IoT Hub query language for device and module twins, jobs, and message routing", Retrieved from: https://docs.microsoft.com/en-us/azure/iot-hub/iot-hub-devguide-query-language, Oct. 29, 2018, 19 Pages.

"International Search Report and Written Opinion Issued in PCT Application No. PCT/US20/036878", dated Sep. 21, 2020, 11 Pages.

* cited by examiner

SOFTWARE INTERFACE 14

```
{
   "@ID": "HTTP://EXAMPLE.COM/THERMOSTAT/1.0.0",
   "@TYPE": "INTERFACE",
   "DISPLAYNAME": "THERMOSTAT",
   "CONTENTS": [
      {
         "@TYPE": ["TELEMETRY", "TEMPERATURE"],   — 54
         "NAME": "TEMP",
         "SCHEMA": "DOUBLE"
      },
      {
         "@TYPE": "PROPERTY",   — 56
         "NAME": "SETPOINTTEMP",
         "WRITABLE": TRUE,
         "SCHEMA": "DOUBLE"
      }
   ],
   "@CONTEXT": "HTTP://EXAMPLE.COM/V0/CONTEXTS/INTERFACE.JSON"
}
```

EXTENDED SOFTWARE INTERFACE 64

```
{
  "@ID": "HTTP://EXAMPLE.COM/THERMOSTAT/1.0.0",
  "@TYPE": "INTERFACE",
  "DISPLAYNAME": "THERMOSTAT",
  "CONTENTS": [
    {
      "@TYPE": "TELEMETRY",
      "NAME": "TEMP",
      "SCHEMA": "DOUBLE"
    },
    {
      "@TYPE": "PROPERTY",
      "NAME": "SETPOINTTEMP",
      "WRITABLE": TRUE,
      "SCHEMA": "DOUBLE"
    },
    {  ─ 66
      "@TYPE": "TELEMETRY",
      "NAME": "GPS",
      "SCHEMA": "DOUBLE"
    }
  ],
  "@CONTEXT": "HTTP://EXAMPLE.COM/V0/CONTEXTS/INTERFACE.JSON"
}
```

FIG. 5

```
"@id": "urn:example:capabailityModels:MXChip:1"
```

FIG. 6

```
{
  "@id": "urn:example:capabailityModels:MXChip:1",
  "@type": "CapabilityModel",
  "displayName": "MX Chip CapabilityModel",
  "implements": [
    {
      "schema": "urn:azureiot:DeviceInformation:1",
      "name": "myDeviceInfo"
    },
    {
      "schema": "urn:example:interfaces:MXChip:1",
      "name": "myMXChip"
    }
  ],
  "@context": "http://azureiot.com/v1/contexts/capabilityModel.json"
}
```

FIG. 7

```
{
    "interfaces": {
        "urn_azureiot_ModelDiscovery_DigitalTwin": {
            "name": "urn_azureiot_ModelDiscovery_DigitalTwin",
            "Properties": {
                "modelInformation": {
                    "reported": {
                        "value": {
                            "capabailityModelId": "urn:example:capabailityModels:MXChip:1",
                            "interfaces": {
                                "urn_azureiot_ModelDiscovery_DigitalTwin":
                                    "urn:azureiot:ModelDiscovery:DigitalTwin:1",
                                "urn_azureiot_ModelDiscovery_ModelInformation":
                                    "urn:azureiot:ModelDiscovery:ModelInformation:1",
                                "myMXChip": "urn:example:interfaces:MXChip:1"
                            }
                        }
                    }
                }
            }
        }
    }
}
```

WHEREIN THE SELECTED SOFTWARE MODEL IS A SOFTWARE INTERFACE, AND THE ONE OR MORE VERSIONING RULES INCLUDE ONE OR MORE OF: NO CHANGES ARE MADE TO THE SOFTWARE INTERFACE WITHOUT INCREASING A VERSION INDICATOR; THE SECOND VERSION OF THE SOFTWARE INTERFACE INCLUDES ALL CAPABILITIES INCLUDED IN THE FIRST VERSION OF THE SOFTWARE INTERFACE; ONE OR MORE CAPABILITIES CAN BE ADDED TO THE SECOND VERSION OF THE SOFTWARE INTERFACE; AND SCHEMA CHANGES TO EXISTING CAPABILITIES ARE NOT SUPPORTED — 2016

WHEREIN THE SELECTED SOFTWARE MODEL IS A CAPABILITY MODEL, AND THE ONE OR MORE VERSIONING RULES INCLUDE ONE OR MORE OF: NO CHANGES ARE MADE TO THE CAPABILITY MODEL WITHOUT INCREASING A VERSION INDICATOR; THE SECOND VERSION OF THE CAPABILITY MODEL INCLUDES ALL SOFTWARE INTERFACES INCLUDED IN THE FIRST VERSION OF THE CAPABILITY MODEL; FOR ALL SOFTWARE INTERFACES INCLUDED IN THE FIRST VERSION OF THE CAPABILITY MODEL, THE VERSION INDICATOR INCREASES RESPECTIVELY; ONE OR MORE SOFTWARE INTERFACES CAN BE ADDED TO THE SECOND VERSION OF THE CAPABILITY MODEL; AND SCHEMA CHANGES FOR NAME AND TYPE ARE NOT SUPPORTED — 2018

SOFTWARE VERSIONING FOR NETWORK CONNECTED DEVICES

CROSS REFERENCE TO RELATED APPLICATIONS

This application claims priority to U.S. Provisional Patent Application Ser. No. 62/880,599, filed Jul. 30, 2019, the entirety of which is hereby incorporated herein by reference for all purposes.

BACKGROUND

In an internet of things (IoT) environment, software solutions that integrate software applications in a cloud computing environment with an IoT device may be modified and enhanced multiple times over the lifetime of a device. Customers and developers implementing IoT software solutions may interact with IoT devices via the software models coded for IoT device operation. However, during the lifecycle of the IoT device, the software models may go through multiple revisions, such as additions in functionality, bug fixes, interface changes, and other modifications.

Software solution backend development for IoT devices may be performed by different teams, organizations and/or vendors. Interoperability issues between the device code and the software solution backend may increase development times and increase workload for the developers. Additionally, software solutions developed for one IoT device type may typically only be applicable to that device type, and may not be quickly adaptable to other IoT device types.

SUMMARY

Computing systems and methods for software model versioning are provided. For example, a computing system may include a logic subsystem and memory storing instructions executable by the logic subsystem to: store, in the memory, a plurality of software models that each describe aspects of a network connected device or a software service, the plurality of software models comprising a first version of a selected software model; receive a second version of the selected software model; validate the second version of the selected software model via validation logic by applying one or more versioning rules to the second version of the selected software model; and based on the application of the one or more versioning rules, the logic subsystem may be configured to execute a versioning action on the selected software model.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 shows an example of the software interfaces of FIG. 1.

FIG. 5 shows an example of an extensible software interface of FIG. 1.

FIG. 6 shows an example model identifier.

FIG. 7 shows an example capability model definition.

FIG. 8 shows an example of a property interface system for a given device.

FIG. 9A-9C are a flowchart of a method according to one implementation of the present disclosure.

DETAILED DESCRIPTION

The development and deployment of internet of things (IoT) devices may be simplified with software modeling for IoT devices that include interaction contracts enabling reuse of software services, such as application programming interfaces (APIs) operating as cloud services, across IoT software solutions for software service and IoT device interaction. An interaction contract may be understood as a data file that defines the schemas and protocols according to which data should be sent and received between a client and server, for example. A software solution may be understood as software that specifically implements software applications in a cloud computing environment that receive data from and/or send commands to network connected devices.

A software interface may express the interaction contracts that describe capabilities of an IoT/network connected device, thus facilitating the efficient integration of network connected devices and software solutions. Software interfaces allow devices to be remotely configured and operated from a service without writing any device code, thereby reducing the surface area between devices and cloud services and helping avoid tightly coupled solutions. Different software solutions may be enabled to interact with a given software interface, and a software solution may be integrated with multiple versions of a network connected device.

As used herein, software models include capability models that describe device functionality, as described further below, and may correspond to a specific product. Software models also include software interfaces as described herein. During the lifecycle of an IoT device, software models may often be modified and enhanced. For example, a device manufacturer or provider may introduce a new capability or may add to existing capabilities. A desirable capability for device manufacturers/providers and solution builders may be the ability to detect and support changes to software models and the IoT device applications that implement the changes corresponding to the software models. Model versioning schema may be helpful in supporting such IoT device upgrade scenarios.

Accordingly and as described in more detail below, the present disclosure provides versioning rules (logic) and schema that may enable a software model to be versioned in a manner that allows a corresponding software solution to accommodate changes to the software model over the lifecycle of an IoT/network connected device. In potential advantages of the present disclosure, such versioning of software models may enable desirable features such as defining lineages between software interfaces and data continuity between updates, whereby telemetry and property data may be maintained across non-breaking upgrades.

Figure 1:
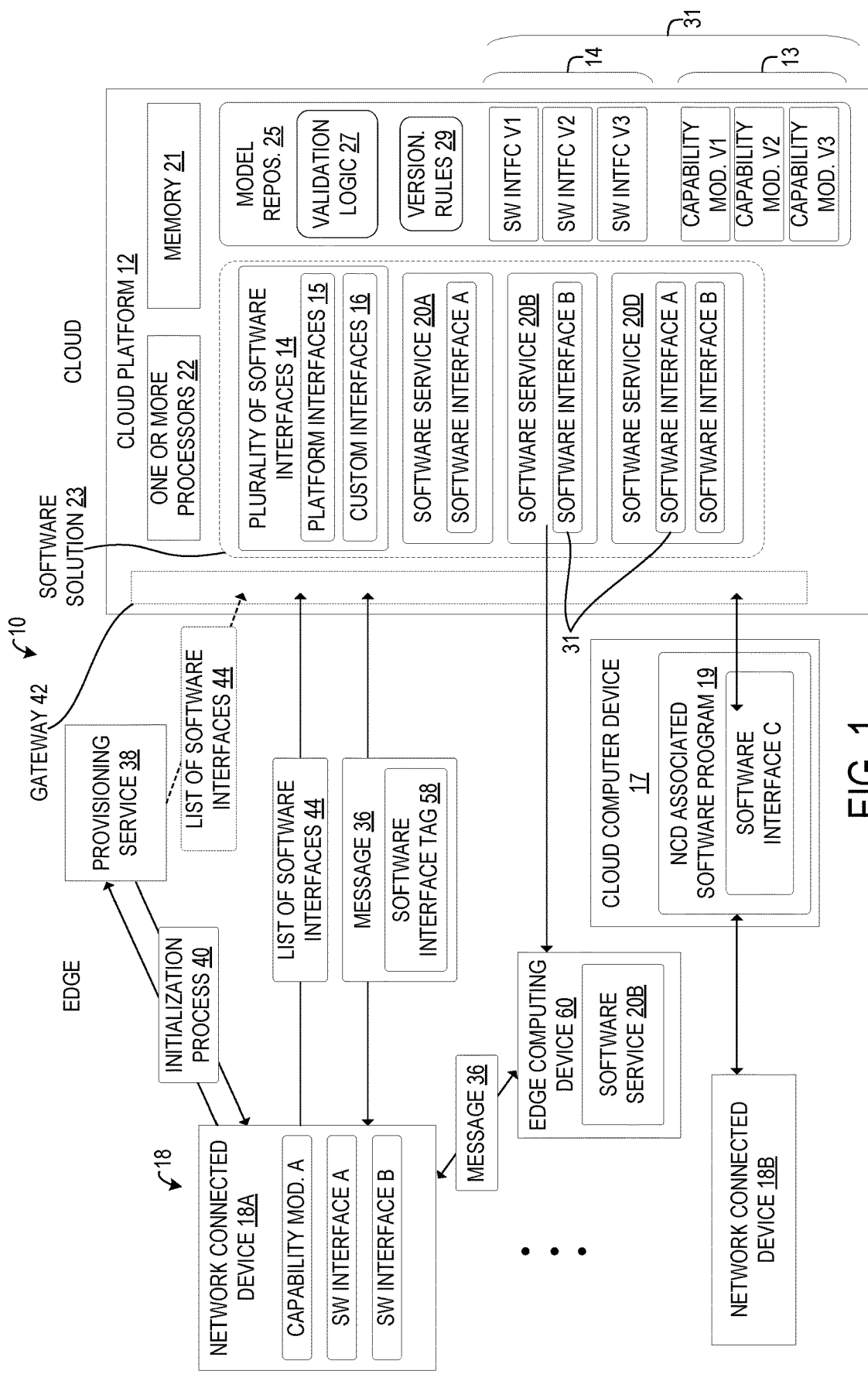
FIG. 1 shows an example computing system for processing data from network connected devices with software services via a software solution.

Following is one example of an ecosystem with which the principles of the present disclosure may be utilized. FIG. 1 illustrates a computing system 10 that includes a cloud platform 12 configured to store and manage a plurality of software models 31 including capability models 13 and software interfaces 14. In one example, the plurality of software interfaces 14 may include platform software interfaces 15 that are provided and controlled by the cloud platform 12. The plurality of software interfaces 14 may further include custom software interfaces 16 that are created by manufacturers of network connected devices 18, developers of software services 20, or other users of the cloud platform 12. Each software interface 14 defines explicit interaction contracts between network connected devices 18 operated by customers and users of the cloud platform 12 and software services 20 created by developers. The software services 20 may be developed by the manufacturers of the network connected devices 18, by third party developers unrelated to the manufacturers of the network connected devices 18, by the users of the network connected devices 18, and by other users of the cloud platform 12. An explicit interaction contract is a data file that defines the schemas and protocols according to which data should be sent and received between a client and server, for example.

In one example, the cloud platform 12 comprises one or more processors 22 configured to execute the processes and functions of the cloud platform 12 described herein. The processors 22 may be included as part of a logic subsystem of the computing system 10. The computing system 10 may also include memory 21 storing instructions executable by the logic subsystem. The memory 21 may include volatile memory and non-volatile memory, as discussed in more detail below with respect to the example computing system 2100 of FIG. 10.

The logic subsystem may be configured to store, in the memory 21, a plurality of software models 31 that may include capability models 13 and software interfaces 14 that may each describe aspects of a network connected device 18 or a software service 20, respectively. Each of the plurality of software models 31 may include one or more versions, such as a first version of a selected software model.

The cloud platform 12 may include one or more server devices configured to operate in a cloud computing configuration. As illustrated in FIG. 1, the cloud platform 12 is configured to execute a plurality of software services 20, each software service 20 interacting with one or more software interfaces 14 operated on by that software service 20. In one example, the plurality of software services 20 are configured to process data according to the explicit interaction contracts of the one or more software interfaces 14 that the software service 20 has been developed to utilize. These software services 20 may be developed by first or third parties, and uploaded to the cloud platform 12. In one example, the cloud platform 12 may perform testing, authentication, and certification processes on each uploaded software service before making those software services available on the cloud platform 12. For example, the cloud platform 12 may be configured to test whether each software service 20 correctly implements one or more software interfaces 14. These software services 20 may then be stored and executed on the cloud platform 12 to process data from network connected devices 18 operated by users of the cloud platform 12.

Figure 2:
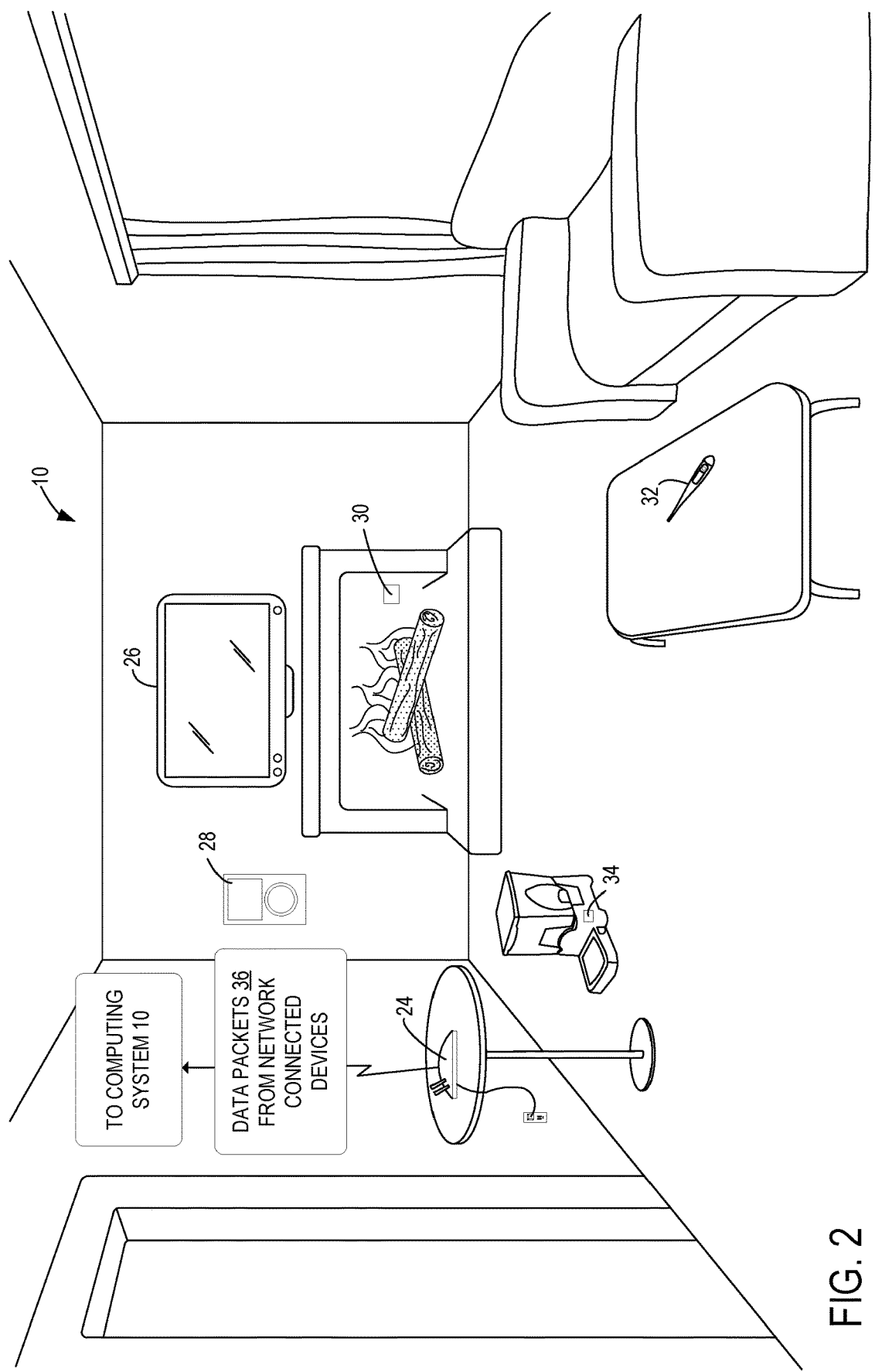
FIG. 2 shows an example of the plurality of network connected devices of FIG. 1.

FIG. 2 illustrates an example of a plurality of network connected devices 18 distributed around an example physical environment, namely, a house of a user. The network connected devices may be configured to connect to a wide area network (WAN) via a router 24. As a specific example, the router 24 may take the form of a wireless network device mediating a wireless network that may be utilized by the plurality of network connected devices 18 in the physical environment. In another example, the plurality of network connected devices 18 may be configured to communicate with a user computing device 26 configured to connect to the WAN via the router 24.

The plurality of network connected devices 18 may take different forms and may perform different processes and functions. In the specific example illustrated in FIG. 2, the network connected devices 18 include a thermostat 28, a fireplace thermometer 30, a body thermometer 32, and a pet food measuring device 34. It should be appreciated that the specific example network connected devices 18 illustrated in FIG. 2 are merely exemplary, and that the network connected devices may take other suitable forms. As a few other non-limiting examples, the network connected devices 18 may take the form of a GPS unit, a vibration/movement sensor, printer, router, lights, HVAC unit, robot, smart speaker, smart watch, asset tracker, a speaker, a smart coffee machine, a refrigerator sensor, other types of sensors and measurement devices, other type of consumer or industrial IoT device, etc. that include processors, memory, stored programs, and communications interfaces that are able to connect to remote servers via computer networks.

In the example illustrated in FIG. 2, each network connected device 18 is configured to measure a physical parameter, such as a temperature or a pet food level. However, it should be appreciated that the network connected devices 18 may take other forms that do not necessarily measure physical parameters, such as, for example, a network connected output device such a printer or display.

In one example, each network connected device 18 may include a processor or another type of hardware-logic component such as, for example, field-programmable gate arrays (FPGAs), program- and application-specific integrated circuits (PASIC/ASICs), program- and application-specific standard products (PSSP/ASSPs), system-on-a-chip (SOC), complex programmable logic devices (CPLDs), etc. The processor of each network connected device 18 may be configured to collect measured physical values via a sensor, perform a process or output, etc. The processor of each network connected device 18 may be further configured to send messages 36 from the network connected device 18 to the computing system 10 via the wireless network mediated by the router 24 and/or via the user computing device 26. In the illustrated example, the user computing device 26 takes the form of a large format display, and may include its own processor, non-volatile storage, volatile storage, and other suitable computer components. However, it will be appreciated that the user computing device 26 may take other suitable forms, such as, for example, a desktop computer device, a laptop computer device, smartphone, tablet computer device, etc.

Turning back to FIG. 1, in one example, when first connecting to a network, each network connected device 18 may be configured to communicate with a provisioning service 38 to perform an initialization process 40. The initialization process 40 may include checking whether any updates to the firmware/software of the network connected device 18 are available. The initialization process 40 may also include initializing the network connected device 18 with an address of a gateway 42 for the cloud platform 12. After receiving the address of the gateway 42 for the cloud platform 12, each network connected device 18 may be configured to communicate with the cloud platform 12 via a WAN.

As illustrated in FIG. 1, each network connected device 18 may be configured to send an indication of software interfaces 14 to the cloud platform 12 implemented by that network connected device 18. The indication may take the form, for example, of a list 44. In one example, each network connected device 18 may be manufactured to implement one or more software interfaces 14, such as, for example, platform software interfaces 15 or custom software interfaces 16 indexed by the cloud platform 12. For example, the software/firmware of the network connected device 18 may be developed to conform to the explicit interaction contracts of the one or more software interfaces 14 the network connected device 18 is implementing. In one example, the list 44 of software interfaces may sent to the cloud platform 12 by the provisioning service 38, such as, for example, during the initialization process 40. In another example, an edge computing device 60, such as an edge gateway, may be configured to communicate with the network connected device 18, and forward the list 44 of software interfaces to the cloud platform 12.

In another example, the one or more software interfaces 14 for a network connected device 18 may be implemented by a network connected device associated software program 19 executed by a cloud computer device 17. The network connected device associated software program 19 may be configured to command and control one or more associated network connected devices 18. In the example illustrated in FIG. 1, the network connected device associated software program 19 is configured to communicate with the example network connected device 18B. The network connected device associated software program 19 is further configured to perform the functions and processes of the network connected devices 18 described herein. For example, the network connected device associated software program 19 may be configured to send the list of software interfaces 44 to the cloud platform 12 as well as send and receive messages 36 with software services 20 executed on the cloud platform 12. The cloud computer device 17 executing the network connected device associated software program 19 may be a cloud server of the cloud platform 12, or may be a computer device separate from the cloud platform 12. In another example, an edge computing device 60 may implement the network connected device associated software program 19, and may similarly be configured to command and control one or more associated network connected devices 18, and send and receive messages with the cloud platform 12.

As a specific example, the network connected device associated software program 19 may take the form of a software-controlled conference room. The network connected devices 18 associated with the network connected device associated software program 19 may include network connected lights that may be turned on/off by the network connected device associated software program 19, occupancy sensors that may send occupancy data to the network connected device associated software program 19, network connected air conditioning devices, etc. Further in this example, the network connected device associated software program 19 may be configured to implement one or more software interfaces 14, and may send/receive messages with software services 20 on the cloud platform. For example, a software service on the cloud platform may include code to command the network connected device associated software program 19 to turn the network connected light devices of the conference room on or off based on occupancy data received from an occupancy sensor network connected device.

In one example, each software interface 14 includes a semantic description of one or more capabilities and descriptive attributes of the network connected device 18 accessible by the plurality of software services 20. As a specific example, the semantic descriptions of the software interfaces 14 may be described using JavaScript Object Notation for Linked Data (JSON-LD). JSON-LD is designed to be usable directly as JSON as well as usable in Resource Description Framework (RDF) systems that provides a standard for describing resources in a distributed, extensible way. The semantic descriptions of the software interfaces 14 provide semantic type annotations of the one or more capabilities and descriptive attributes of the network connected devices 18, so that analytics, machine learning, user interfaces, and other computation can reason about the semantics of data received from that network connected device 18. It will be understood that semantic type annotations are human readable and machine readable, and can form the basis for downstream searching and data analytics of human readable and machine readable categories of data. For example, physical values measured by the thermostat 28, the fireplace thermometer 30, and/or the body thermometer 32 example networked connected devices 18 of FIG. 2 may be semantically annotated as "temperature". In this manner, the measured physical values sent to the cloud platform 12 by these example network connected devices 18 can be reasoned about as temperature (charted together, compared, converted to like units, etc.).

Figure 3:
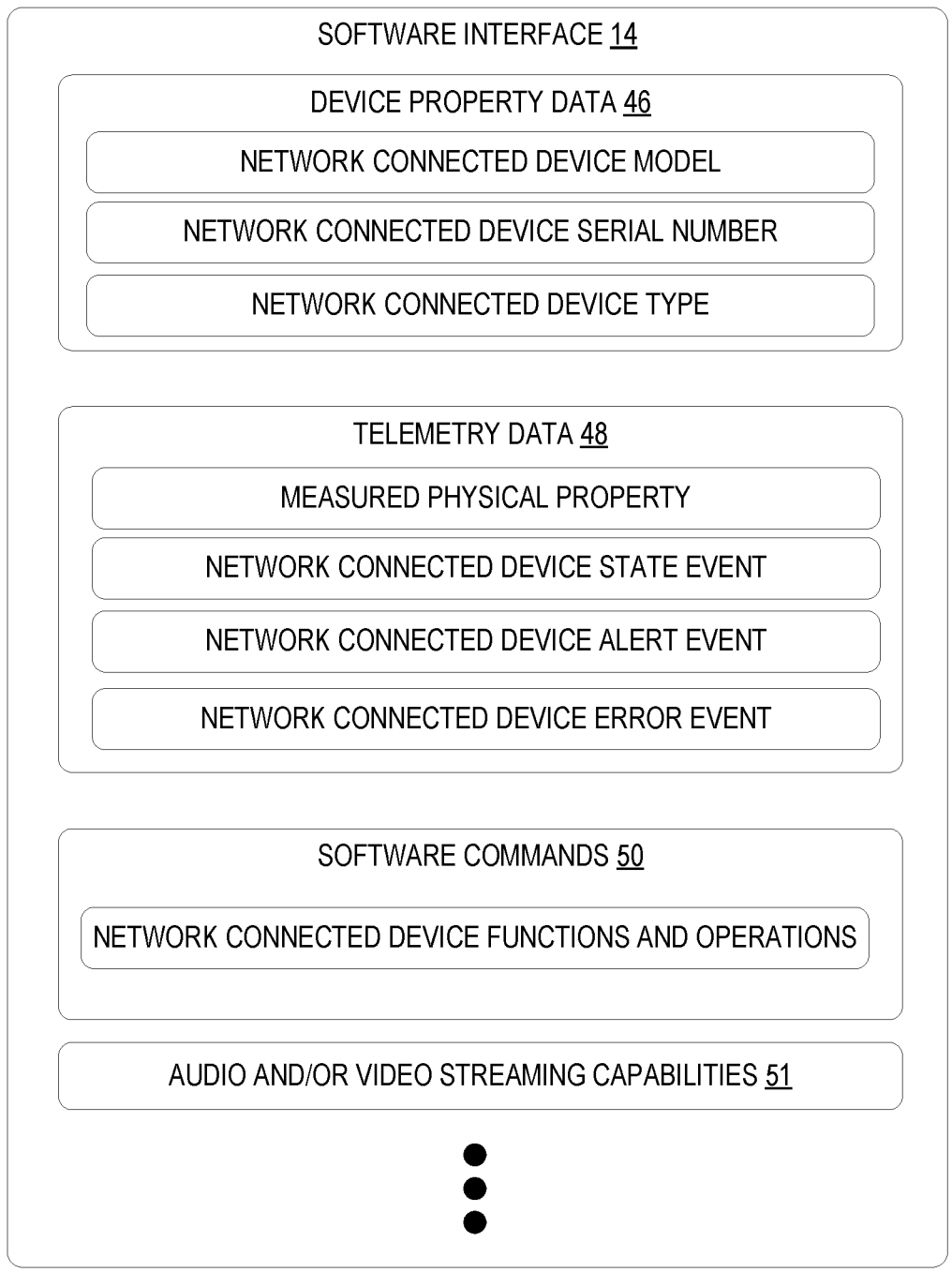
FIG. 3 shows a schematic view of the software interfaces of FIG. 1.

FIG. 3 illustrates an example software interface 14. The one or more capabilities and descriptive attributes of the network connected devices 18 may include device property data 46, telemetry data 48, software commands 50, and audio and/or video streaming capabilities 51 implemented by the network connected device, as a few non-limiting examples. However, it should be appreciated that other types of capabilities and descriptive attributes not described herein may also be included in the software interfaces 14. These capabilities describe related sets of functionalities utilized by the particular type of network connected device 18, such as, for example, the capabilities of a thermometer, a pet food measurement unit, an asset tracker, etc. In one example, the semantic description of the software interface 14 includes a network connected device property, such as a network connected device model, a network connected device serial number, a network connected device manufacturer, a network connected device operating system, a network connected device memory property, and a network connected device type. However, it should be appreciated that other types of read-only or read/write properties of a network connected device 18 may also be included in the software interface 14 for the network connected device property data 46.

In another example, the semantic description of the software interface 14 includes one or more defined events that can be generated by the network connected device 18 and emitted as telemetry data 48. The one or more defined events may include a physical property measured by the network connected device, a device state event, a device alert event, and a device error event. It should be appreciated that the defined events described above are merely exemplary, and that other types of events may be semantically described in the software interfaces 14.

In another example, the semantic description of the software interfaces 14 includes one or more software commands implemented by the network connected device 18. The semantic description may describe the functions and operations that the network connected device 18 can be instructed to execute by the software services 20. For example, the semantic description may describe a function name for the available commands, a developer comment describing what that command will do, a type of command execution such as synchronous or asynchronous, a data type for an input to the command, and a data type for an output of the command.

FIG. 4 illustrates a specific example of a software interface 14. The example software interface 14 includes a semantic description 52 of one or more capabilities and descriptive attributes of the network connected devices 18. In the illustrated example, the semantic description 52 includes a defined telemetry event 54 for physical property data measured by the network connected device. As illustrated in FIG. 4, the defined telemetry event 54 further includes an additional semantic type "Temperature", which may be used to indicate that the telemetry data can be reasoned about as both telemetry and temperature. The semantic description 52 also indicates that the physical property measured by the associated network connected device 18 will be emitted as a double data type. Thus, any software service 20 configured for the illustrated software interface 14 can expect that the data emitted by the network connected device is a temperature value of the double data type, and may process that data accordingly. In this manner, the data emitted by the network connected device can be reasoned about as temperature (charted together, compared, converted to like units, etc.) by those software services 20. As another specific example, a body thermometer network connected device may implement a software interface 14 that includes a defined telemetry event 54 that further includes a BodyTemperature semantic type (e.g. {"@type": ["Telemetry", "Temperature", "BodyTemperature"], "name": "temp", "schema": "double"}), which may be used to indicate that the telemetry data can be reasoned about as telemetry, temperature, and body temperature. It should be appreciated that while the examples illustrated in FIG. 4 and described above are based on the JSON-LD way of expressing semantic types, the software interfaces 14 are not limited to the JSON-LD. The software interfaces 14 may utilize any other suitable programming language, and may express semantic type via other suitable means.

In the illustrated example, the software interface further includes a semantic description for an example network connected device property 56. However, it should be appreciated that software interfaces 14 may include semantic descriptions for any suitable number of capabilities and attributes of network connected devices, such as, for example, one, three, seven, etc. As illustrated, the semantic description 52 for the example network connected device property 56 indicates that the network connected device includes a SETPOINTTEMP property that is writable with a double data type value. Similarly as described above with the defined telemetry event 54, the SETPOINTTEMP writable property may include a temperature semantic type (e.g. {"@type": ["Property", "Temperature"],) Thus, software services 20 configured to operate on the software interface illustrated in FIG. 4 may reason that the SETPOINTTEMP is both a property and a temperature, and may send instructions to the thermostat network connected device to set its SETPOINTTEMP value to particular temperature value. As both the thermostat network connected device and the particular software service 20 are configured for the example software interface illustrated in FIG. 4, both the manufacturer of the thermostat network connected device and the developer of the particular software service 20 may have a common understanding of how the SETPOINTTEMP value of the thermostat network connected device may be manipulated. Further, in this manner, the software service 20 implementing the software interface will also be compatible with other network connected devices which may take other forms or created by other manufacturers, if those other network connected devices are implanting the software interface 14 illustrated in FIG. 4.

Turning back to FIG. 1, each network connected device 18 may be configured to implement one or more of the software interfaces 14. The cloud platform 12 is configured to receive, from a network connected device 18, an indication such as a list 44 of the one or more software interfaces implemented by the network connected device 18. In one example, the one or more software interfaces 14 includes one or more platform software interfaces 15 managed by the cloud platform 12 and/or one or more custom software interfaces 16 created by manufacturers and developers. The platform software interfaces 15 may include, for example, software interfaces 14 for device information, application management, certification management, diagnostic logs, factory reset functions, reboot management, etc. However, it should be appreciated that developers and manufacturers may create and manage their own custom software interfaces 16 that may be implemented by the software services 20 and network connected devices 18.

After receiving the list 44 of software interfaces from the network connected device 18, the cloud platform 12 may be configured to select one or more software services 20 based on a match between the one or more software interfaces 14 implemented by the network connected device 18 and the one or more software interfaces 14 operated on by the plurality of software services 20. In the example illustrated in FIG. 1, the network connected device 18A is configured to implement the software interface A and software interface B of the plurality of software interfaces 14. After receiving the list 44 of software interface 44 from the network connected device 18A, which, in this specific example, includes software interface A and software interface B, the cloud platform 12 is configured to compare the received list 44 of software interfaces to the software services 20 known to the cloud platform 12. In particular, the cloud platform 12 may be configured to filter the plurality of cloud services 20 based on the list 44 of software interfaces 44 received from the network connected device 18A. In the illustrated example, the software service 20A is configured to operate on the software interface A, and the software service 20B is configured to operate on the software interface B. Thus, the cloud platform 12 may be configured to select the software services 20A and 20B to process data and operate the network connected device 18A.

In one example, the software services 20 are executed by one or more server devices of the cloud platform 12, and the cloud platform 12 is configured to process data received from the network connected device 18 using the selected software services 20 according to the explicit interaction contracts of the one or more software interfaces 14. As a specific example, messages 36 received from and sent to the network connected device 18 may include a software interface tag 58 which indicates a particular software interface 14 that the data in the message 36 is associated with or otherwise conforms to. As a specific example, the thermostat network connected device may be configured to tag each message 36 that includes measured values for temperature data with a software interface tag 58 indicating the example software interface 14 of FIG. 4.

After receiving a message 36, the cloud platform 12 may be configured to route the message 36 to the selected software service 20 configured for the software interface 14 indicated in the software interface tag 58 of that message 36. In this manner, each message 36 may be routed to and processed by the appropriate software service 20. Messages 36 sent by software services 20, such as, for example, software commands, may also be tagged with the appropriate software interface tag 58 and sent to the network connected device 18 over the WAN.

In another example, the cloud platform 12 may be configured to identify an edge computing device 60 that may be configured to execute one or more software services 20 managed by the cloud platform 12, and is logically located on the same side of a WAN as the network connected device 18 relative to the cloud platform 12. As illustrated in FIG. 1, after identifying an edge computing device 60, the cloud platform 12 may be configured to send one or more of the selected software services 20 to the edge computing device 60, which may be configured to execute those software services 20. The cloud platform 12 may configure the network connected device 18 to route messages processed by the selected software service 20 to the edge computing device 60. Additionally, commands and messages from the cloud platform 12 to the network connected device 18 may also be routed through the edge computing device 60.

In this example, the traffic from the cloud platform 12 may be processed by the edge computing device 60, which may send further commands and/or messages to the network connected device 18. The edge computing device 60 may be configured to process the messages 36 with the selected software service 20 as described herein, and perform and functions or processes of the selected software service 20. In this manner, the one or more selected software services 20 are executed by the edge computing device 60 that is separate from the cloud platform 12 configured to store the one or more software services 20. In the example illustrated in FIG. 1, software service 20B has been sent to the edge computing device 60. Thus, the example network connected device 18A may be instructed to route messages 36 associated with the software interface B to the edge computing device 60. On the other hand, messages 36 associated with the software interface A may be routed to the cloud platform 12, which is configured to execute the software service 20A configured to operate on the software interface A.

In some examples, the plurality of software interfaces 14 and the plurality of software services 20 are extensible. For example, users may select a software interface 14, and add additional semantic description and/or additional interaction contracts to the selected software interface 14. After extending the selected software interface, the extended software interface may be uploaded to the cloud platform 12.

Similarly, the software services 20 are extensible. Users may select one or more software services 20 stored on the cloud platform 12, and add additional code to the selected software service. The extended software service 20 may then be uploaded to the cloud platform 12 and used to process data from a network connected device 18 of that user. In this manner, users may utilize already existing software interfaces 14 and software services 20 available on the cloud platform 12 to generate their own software solutions by extending those existing software interfaces 14 and software services 20 to meet their specific needs. Further, and as described in more detail below, the versioning techniques of the present disclosure enable software interfaces and/or capability models (collectively, software models) to be versioned in a manner that allows a corresponding software solution to accommodate changes to the software model over the lifecycle of an IoT/network connected device. As noted above, such versioning methods may enable lineages to be defined between software interfaces and data continuity maintained between updates, whereby telemetry and property data may be maintained across non-breaking upgrades.

FIG. 5 illustrates an example extended software interface 64. In this example, the user has selected the example software interface 14 illustrated in FIG. 4, and has added a new telemetry capability 66 to the software interface 14. As illustrated, the extended software interface 64 includes a telemetry capability with a semantic description identifying that the physical value being measured is a "GPS" value that is provided in the double data type. The extended software interface 64 may then be uploaded by the user to the cloud platform 12. The user may further select a software service stored on the cloud platform 12, and add additional code to the selected software service to appropriately process the user's extended software interface 64. In another example, the extension to the software interface 14 may be authored and stored separately from the original software interface. In the specific example illustrated in FIG. 5, rather than adding the new telemetry capability 66 to the code of the original software interface 14, the new telemetry capability 66 could be authored and stored separately from the original interface, and uploaded to the cloud platform 12 with an indication that the new telemetry capability 66 is an extension to the original software interface stored on the cloud platform 12. As discussed above, software model versioning and versioning logic may advantageously enable software solutions to maintain data continuity between updates and software model versions, whether executed in conjunction with capability models 13 and/or software interfaces 14. Using the configurations and techniques described herein, developers and users alike may more easily configure network connected devices (IoT devices) and software solutions as properties, commands, and telemetry data are maintained throughout version changes of the software models 31. Accordingly, and in one potential advantage of the present disclosure, a necessity to ubiquitously upgrade all IoT devices connected across a given network in an instance of one or more device-specific fixes or upgrades being provided may be avoided. In this manner, the same software solution can target devices utilizing not only an initial/first version but also later software model versions, and maintain data continuity, without the constraint of requiring all network connected devices to upgrade to a latest version.

As described above and with reference again to FIG. 1, the plurality of software models 31 may include a first version of a selected software model, which may be a software interface 14 or a capability model 13. The logic subsystem of the computing system 10 may be configured to receive a second version of the selected software model. As described in more detail below, the second version of the selected software model may be validated via validation logic 27 by applying one or more versioning rules 29 to the second version of the selected software model. Based on the application of the one or more versioning rules 29, the logic subsystem may be configured to execute a versioning action on the selected software model.

In FIG. 1, the versioning rules 29 may be included in a model repository 25. The versioning rules 29 also may be executed at other parts of the computing system 10 as well. Also in FIG. 1, software interface v1 may be an example of the first version of the selected software model, and software interface v2 may be an example of the second version of the selected software model. In another example, the first version of the selected software model may be capability model v2 and the second version may be capability model v3.

As described above, in the environment of the computing system 10 of FIG. 1, the logic subsystem may be configured to execute the software service 20 via a software solution 23 configured to integrate with the network connected device(s) 18. The selected software model may integrate the network connected device(s) 18 with the software service 20.

The software model versioning techniques of the present disclosure enable software solutions to implement different approaches utilizing different versioning rules having varying levels of restrictions, such as strict model versioning and relaxed model versioning. In both strict and relaxed versioning, the versioning action may include outputting a breaking changes error for breaking changes to the selected software model that include one or more of removing capabilities from software interfaces 14, removing software interfaces 14 from capability models 13, and schema changes.

In strict versioning, a software solution 23 as shown in FIG. 1 may be coded for specific software interface versions; that is, the software solution 23 may be configured to detect a specific version of the software model 31 before interacting with a network connected device 18. A particular functionality associated with the software model 31 may be assumed, and thus a specific version may be expected by the software solution 23. Code and/or configuration changes may be required before new versions are supported. In this lower-trust approach, adherence to the versioning rules 29 may not be assumed.

In strict versioning one or more versioning rules 29 are applied and versioning actions based on such applied rule(s) are executed. For example, for a software solution 23 coded for the first version of the selected software model and the network connected device 18 supporting the second version of the selected software model, added capabilities in the selected software model may not be maintained. For a software solution 23 coded for the first version of the selected software model and a software interface 14 coded for the second version of the selected software model, a property value error for property values in the selected software model may be output. For the software solution 23 coded for the first version of the selected software model and the network connected device 18 supporting both the first version and the second version of the selected software model, the software solution 23 may support only the first version of the selected software model.

In relaxed versioning, software model changes may be accommodated at runtime of a software solution 23. This configuration may allow for data continuity between version changes. The relaxed versioning approach may include that the software solution 23 is coded for ranges of software interface versions and the software solution 23 supports new software interface versions at runtime without additional code and/or configuration changes. For example, where a new software model version for a network connected device 18 is deployed, the software solution 23 may correlate with and understand which previous software model versions may have sent data for historical analysis and/or setting continuity. Code may support ranges of software interface versions that may support new versions at runtime without code and/or configuration changes. "Lazy" versioning may also be included, where a developer may not have correctly addressed or applied the applicable versioning requirements/rules. In this manner, a higher-trust approach may be implemented where adherence to the versioning rules 29 may be assumed.

In relaxed versioning one or more versioning rules 29 are applied and versioning actions based on such applied rule(s) are executed. For example, in relaxed versioning the versioning action may include, for a software solution 23 coded for the first version of the selected software model and the network connected device 18 supporting the second version of the selected software model, maintaining capabilities in the selected software model for added capabilities. For the software solution 23 coded for the first version of the selected software model and a software interface 14 coded for the second version of the selected software model, the versioning action may include retrieving property values in the selected software model. For the software solution 23 coded for the first version of the selected software model and the network connected device 18 supporting both the first version and the second version of the selected software model, the software solution 23 may support both the first version and the second version of the selected software model.

In the description that follows, it will be understood that a capability model 13 may describe the entirety of the functionality of a given network connected device 18, and may correspond to particular product or SKU of IoT product/device. A software interface 14 may be a component of the overall capability model 13, and may be expected to be a reusable component. A software interface 14 may describe areas of common functionality, such as sensor data and/or device management, for example. Although the software interface 14 may be standardized, it may be applied across different capability models 13. Identifying parts in the software model 31 may include protocol for a naming scheme, namespace, aspects related to the interface and capability models, and name aspects, to give some examples.

In order to effectively execute software model versioning for data continuity, a number of versioning rules 29 may be considered. When the selected software model is a software interface 14, the one or more versioning rules 29 may include that no changes are allowed to the software interface 14 without increasing a version indicator; the second version of the software interface 14 must include all capabilities included in the first version of the software interface 14; one or more capabilities can be added to the second version of the software interface 14; and schema changes to existing capabilities are not supported.

When the selected software model is a capability model 13, the one or more versioning rules 29 may include that no changes are allowed to the capability model 13 without increasing a version indicator; the second version of the capability model 13 must include all software interfaces 14 included in the first version of the capability model 13; for all software interfaces 14 included in the first version of the capability model 13, the version indicator increases respectively; one or more software interfaces 14 can be added to the second version of the capability model 13; and schema changes for name and type are not supported.

Particular examples of versioning rules 29 also may include that capability models 13 and software interfaces 14 must be versioned by a single version number (positive integer) in the last segment of their identifiers in order to facilitate model versioning. Once a version of a capability model 13 and/or software interface 14 is finalized (published, used in production, etc.), its definition may be made immutable such that no changes may be made to the capability model 13 and/or software interface 14 without incrementing the version. Certain versioning rules 29 may apply for the newer version of the capability model 13 and/or software interface 14. Non-schema changes for an interface model may be applied on fields like display name, description, comment, and/or display unit. Schema changes such as name, type, command type, and/or writable properties may not be allowed and removing existing capabilities may not be allowed.

When a software model version is incremented, a newer version of an existing capability model 13 may be required to implement all software interfaces 14 from previous versions. New software interfaces and new software interface versions may be allowed for the capability model 13. Non-schema changes that may be allowed for the capability model may include display name, description, and/or comment; however, type and/or name changes to schema may not be allowed, nor the removal or existing interfaces.

Other rules that may be followed depending on the implementation may include that multiple already-published capabilities may not be targeted by a software solution 23. Monotonic versioning may also be implemented. At an IoT hub, such as cloud platform 12, it may be specified which versions for network connected devices 18 may be allowed; that is, a policy may be set by the software solution 23. For example, a policy may specify that only device firmware versions X and later, X and earlier, or only specific version X is/are allowed. A software development kit (SDK) may not support removing a software interface 14 as part of discovery.

Continuing with FIG. 1, an example model repository 25 is shown within the cloud environment. The model repository 25 may include a plurality of versions for capability models 13 and/or software interfaces 14. The model repository 25 may be connected to the cloud platform 12 from, for example, a client device. In some examples the model repository 25 may be hosted in the cloud platform 12, elsewhere in the cloud, or any other suitable location. Solution developers, device builders, and the like may create incremented versions for capability models 13 and software interfacesn14 to be uploaded to the model repository 25 as discussed in the examples below.

In one implementation, the validation logic 27 is executed in the model repository 25. The validation logic 27 may include, where no prior versions of the selected software model are in the model repository 25, executing a create operation. Where both lower versions of the selected software model and no higher versions of the selected software model are in the model repository 25, the validation logic 27 may include querying a highest version of the selected software model that is less than an input version of the selected software model and validating the input version of the selected software model according to the one or more versioning rules 29. Where a higher version and no lower versions of the selected software model are in the model repository 25, the validation logic 27 may include querying a lowest version of the selected software model that is greater than the input version of the selected software model and validating the input version of the selected software model according to the one or more versioning rules 29. Where both lower versions of the selected software model and higher versions of the selected software model are in the model repository 25, the validation logic 27 may include querying both the highest version of the selected software model that is less than the input version and the lowest version of the selected software model that is greater than the input version of the selected software model and validating the input version of the selected software model according to the one or more versioning rules 29.

Application programming interfaces (APIs) that enable a network connected device 18 to register its model identifier and its version may be generated for the computing system 10. The software solution 23 may include one or more version agnostic APIs that enable a network connected device 18 to send/receive data from the cloud platform 12. Additionally, version agnostic APIs may be included that enable software solutions to implement either strict or relaxed model versioning. As such, with a version agnostic API a software developer may be enabled to access specific software interfaces 14 or all software interfaces 14 supported by a particular network connected device 18.

In one implementation, APIs may be implemented without version numbers. As such, any published version of the software solution 23 may be targeted in these cases. However, in this form of versioning it may be that a lowest-common-denominator type version, which may be an original version, is targeted in instances where another version is not found or is not employable. For example, an API may not broadcast the version it's targeting, such that the API may attempt to target any of the published versions (X, Y, Z) as long as the relevant capability exists. Accordingly, the lowest common denominator is always honored (e.g., backwards compatibility) to thereby ensure that capabilities in earliest version would be present in all later versions.

In these configurations, a number of potential advantages may be possible. Network connected devices 18 may be configured to register their respective software interfaces 14 along with a version for an accompanying software solution 23 at any point during the lifecycle of the network connected device 18. Software solutions 23 may be configured to identify which software interfaces 14 and versions of the software interfaces 14 the network connected device 18 may support, either at a first connection and/or at any point during the lifecycle of the network connected device 18. The software solutions 23 may be configured to determine which network connected devices 18 may support a particular software interface version. In one implementation, device and/or model developers may be provided with a method by which software model aspects may be deprecated while still maintaining data continuity.

In the description that follows, it will be appreciated that while particular examples of model versioning are given, model versioning may apply irrespective of format. In one implementation, in order to provide data continuity in model versioning, software interface and capability model identifications may follow a specific format. Any suitable format may be utilized, such as an international resource identifier (IRI) or uniform resource name (URN) format. In one implementation and as described further below with reference to FIG. 6, the identifier string may begin with "urn". Each part may only contain the characters a-z, A-Z, 0-9, and underscore. The only separator that may be allowed may be the colon character, ":". The identifier may be case sensitive. Also, the maximum length of the model ID may be 256 characters, although in other examples a longer length model ID (512, 1024, etc.) may be utilized. In one implementation, a given version of a software solution 23 may be agnostic, where the component name may not be specified. While the name may be targeted in a first version, subsequent software solutions 23 may be agnostic. In the case of APIs, the name may be used to target data, with name-to-version data already stored in the IoT hub.

The following is one example of how a developer and/or device builder may interact with schema. A given set of IoT devices, or network connected devices 18, may include a plurality of software solutions 23 of different versions, each version corresponding to a different set of capability model versions and software interface versions. In this example, the device builder ships a product that implements the software interface Location(v1) that sends latitude and/or longitude telemetry. The solution developer builds an application to store and display location based on the Location (v1) interface. The device builder creates a new software interface version Location(v2) that adds additional capabilities (e.g., altitude telemetry) and no breaking changes. The device builder begins shipping devices that implement Location(v2).

In strict model versioning, the software solution 23 requires a specific version, v1. The device supporting v2 may be provisioned with the software solution 23. Telemetry may be routed based on the interface ID for v1, and thus the v2 telemetry may be routed differently or not at all. When the product version is tested, the solution developer may quickly update solution code so that telemetry from v1 and v2 are routed appropriately. The solution developer may add new code at a later time to take advantage of an additional altitude capability in v2. In the relaxed versioning approach, the software solution 23 may require a minimum version, i.e., v1 and higher. The device supporting v1 may be provisioned with the software solution 23. Telemetry may be routed based on the software interface name as well as a minimum version (v1) and potentially a maximum version, thus the v2 telemetry may be routed as well. The solution developer may add new code at a later time to take advantage of an additional altitude capability in v2.

In another example, a device upgrade for a network connected device 18 may be released by a device partner that introduces new capabilities. In this example, the device builder may ship a product that may implement a first version of a software interface Location(v1) that sends latitude and/or longitude telemetry and provides a battery life property. A solution developer may build an application to store and display location based on the Location(v1) interface, as well as report the current battery life and reset the GPS sensor. A device builder may create a second software interface version Location(v2) that may add additional capabilities (e.g., altitude telemetry, a GPS sync frequency setting, and a GPS reset command) with no breaking changes. An update of firmware for v2 may be deployed.

In strict model versioning, the software solution 23 requires a specific version, v1. A network connected device 18 may be upgraded to firmware v2 and register the interface Location(v2) as part of network connected device discovery. The software solution 23 may be written to check the device's interface IDs when property values such as the battery level are checked. When the interface ID does not match what is expected, the software solution 23 may be configured to recognize the network connected device 18 as noncompliant and may resort to a noncompliant behavior (e.g. showing an error or considering the network connected device 18 as "unassigned" to a model). In a relaxed versioning approach, the software solution 23 may be configured for a minimum version (v1) and greater, and potentially a maximum version. As such the network connected device 18 may be upgraded to firmware version 2 and Location(v2) may be registered as part of the device discovery. The software solution 23 may be written to retrieve property values such as the battery level if the network connected device 18 has registered the same interface name. Also, data within properties and telemetry that existed prior to the upgrade may be preserved for the software solution 23 without migrating the data or re-syncing from the network connected device 18.

In another example, a device partner publishes a new version of a software interface 14 into the model repository 25, such as part of device certification. In this example, the device builder may ship a product that implements the interface Location(v1) that sends latitude and/or longitude telemetry. The firmware may be version 1. The device builder may publish the Location(v1) interface into the model repository 25 in preparation for device certification.

The device builder may create a new interface version Location(v2) that may add additional capabilities such as altitude telemetry, a GPS sync frequency property, and a GPS reset command. The firmware update of version 2 may be released without breaking changes. The device builder may publish Location(v2) into the model repository 25. Both Location(v1) and Location(v2) may be listed in the model repository 25. The device builder may create a new software interface version Location(v3) that may remove the GPS frequency property in v2 and change the latitude and/or longitude schema type from telemetry to properties. The device builder may attempt to publish Location(v3) into the model repository 25, but receives an error due to breaking changes that were introduced in v3.

In another example, a device partner may implement support for multiple software interface versions such that the network connected device 18 may be compatible with software solutions 23 following strict model versioning. The intention of the device partner may be device backwards compatibility. The device builder may ship a product that implements the interface Location(v1) that sends latitude and/or longitude telemetry. The firmware version may be version 1. The solution developer may build an application to store and display location based on the Location(v1) interface, as well as report current battery life and reset the GPS sensor. The device builder may create a new interface version Location(v2) that adds additional capabilities (e.g. altitude telemetry) and no breaking changes. The device builder may implement device code to support both v1 and v2. However, the software solution 23 may be written such that it will only work with v1 in the strict model versioning. A network connected device 18 supporting both v1 and v2 may be provisioned into the software solution 23 but work based on v1 functionality only (i.e. latitude and/or longitude data). The solution developer may add new code at a later time to take advantage of additional altitude capability in v2.

With reference now to FIG. 6, an example of a model ID format is provided. In this example, the Interface Identifier (id) format is URN, and the model ID format must start with the string "urn:". Each part may only contain the characters a-z, A-Z, 0-9, and underscore. The only separator allowed is the colon character ':'. The identifier is case sensitive. The max length of the model ID is 256 characters and it must contain a minimum of four segments, with "urn:" as first the segment, namespace as one or more segments, name being the next-to-last segment, and version as the last segment.

In an example of a software model version format, the following will be appreciated. All software models 31 (capability models 13 and software interfaces 14) must include the software model version as a single part positive integer. The identifier (id) field URN must include the version as the last part (segment) of the URN. Once the software model 31 format is published it becomes immutable and no changes are allowed.

In the example of FIG. 6, and in one example of a software model version change, the extracted version number is "1" and the following will be appreciated. Newer software model version numbers should be greater than the previous software model version numbers. Newer versions of an existing software interface 14 must include all capabilities from previous versions, and only new capabilities can be added. Neither schema changes nor removal of an existing capability are supported. Other allowed changes to the existing capabilities in a newer version of the software interface 14 include displayName, comment, description, and displayUnit.

For a newer version of an existing capability model 13, all the implemented software interfaces 14 from the previous version must be included. Only version increases for existing software interfaces 14 are allowed in the implements section, and only new software interfaces 14 may be added to the implements section. Other allowed changes in the newer versions of the capability model 13 include displayName, comment, and description.

An example capability model definition is given in FIG. 7. FIG. 7 shows an example MXChip capability model definition. The capability model definition may include a set of software interfaces that are implemented for a property. The implement section in the capability model 13 must have the name and schema field pair for each of the software interfaces 14 implemented in the capability model 13. For this implementation, the following will be appreciated. The "schema" field must match the @id of the software interface 14 or the software interface 14 defined inline in the capability model 13. Format rules are the same as Model Id format. The "name" field is a user provided instance name of the software interface 14. The "name" field must start with one of the characters a-z or A-Z or underscore. Allowed characters are a-z, A-Z, 0-9 and underscore. "Name" is case sensitive.

With respect to the model repository 25, an example of which is given in FIG. 1, CRUD operations may be based on the identifier of the interface. The following examples are for GET & PUT REST operations of an interface model id "urn:example:interfaces:MXChip:2":

"GET/Models/urn:example:interfaces:MXChip:2" and
"PUT/Models/urn:example:interfaces:MXChip:2".

FIG. 8 shows an example of a digital twin system interface for a given device. Model information of a digital twin may be retrieved through the digital twin system interface. This interface provides complete model info about a device, including the capability model ID, version, and the set of software interfaces and their versions as a system interface format. The digital twin system interface may also be included as one of the interfaces in the get all interfaces API response as "GET /digitalTwins/{digitalTwinId}/Interfaces/urn_axureiot_ModelDiscovery_DigitalTwin".

A software solution 23 may be configured to discover the set of network connected devices 18 that have specific versions of a software interface 14 or specific versions of a capability model 13. To address the requirement of finding devices supporting X interface, there may be two filter methods added to the existing hub query language, which may be "HAS_INTERFACE('interface_id_without_version', [version])" and "HAS_CAPABILITYMODEL('interface_id_without_version', [version])". Examples include "SELECT * FROM devices" and "WHER HAS_INTERFACE ('urn:example:interfaces:MXChip')".

Figure 9A:
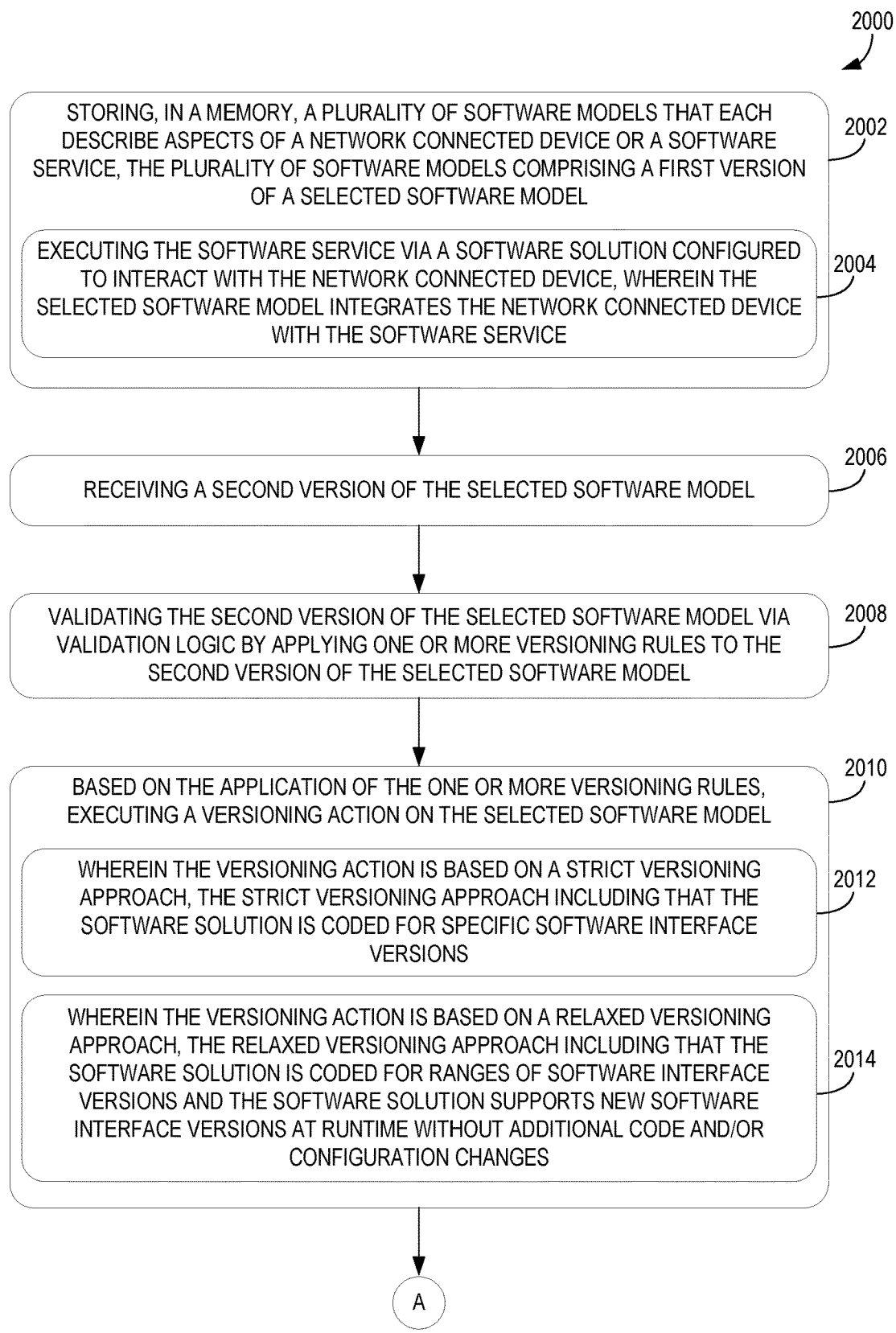
Figure 9C:
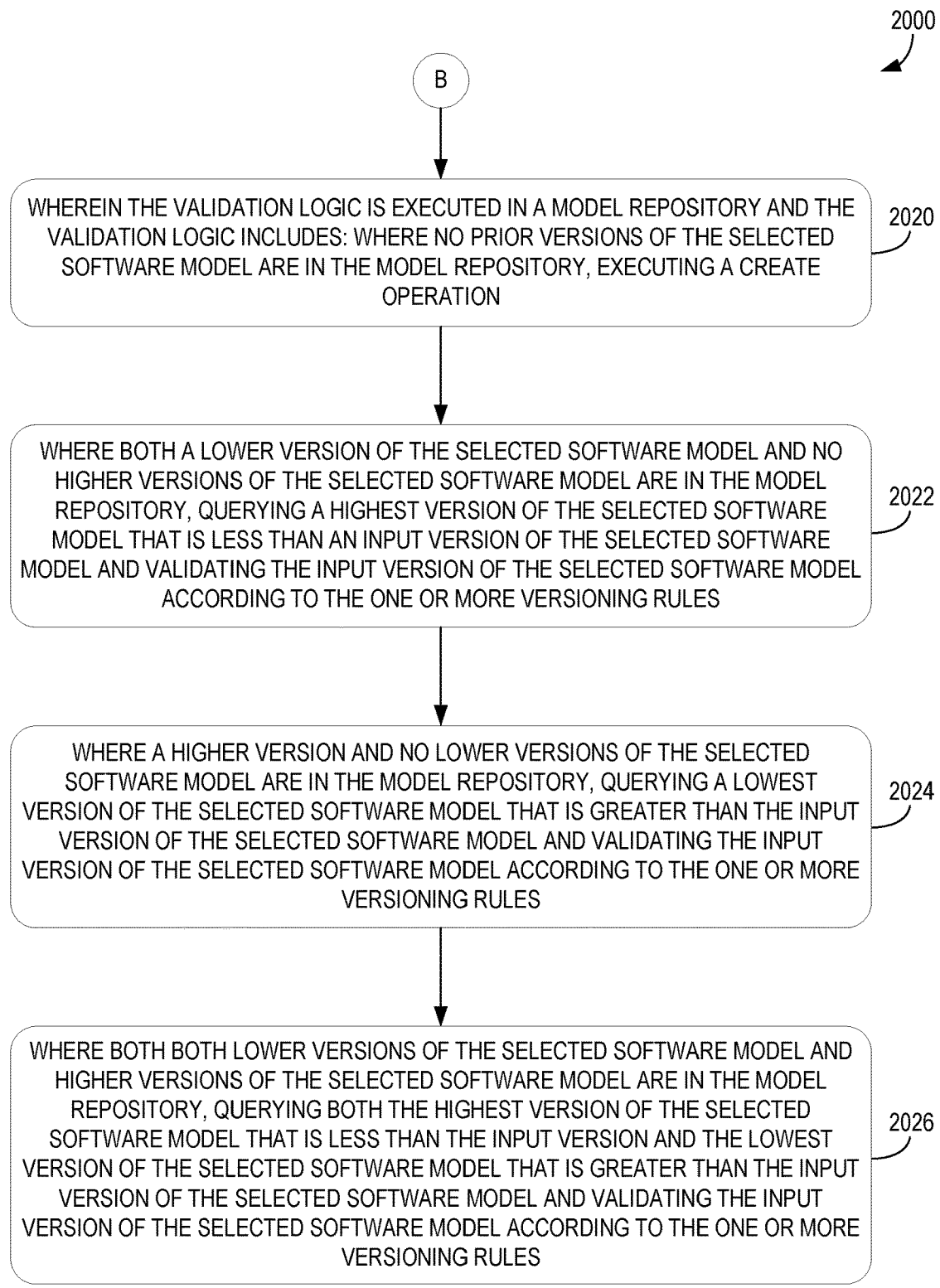

With reference now to FIG. 9A-9C, a flow diagram is provided depicting an example method 2000 for software model versioning according to examples of the present disclosure. The following description of method 2000 is provided with reference to the software and hardware components described herein and shown in FIGS. 1-8. It will be appreciated that method 2000 also may be performed in other contexts using other suitable components.

With reference to FIG. 9A, at 2002, the method 2000 includes storing, in a memory, a plurality of software models 31 that each describe aspects of a network connected device 18 or a software service 20, the plurality of software models 31 comprising a first version of a selected software model. At 2004, the method 2000 may include executing the software service 20 via a software solution 23 configured to interact with the network connected device 18, wherein the selected software model integrates the network connected device 18 with the software service 20. At 2006, the method 2000 includes receiving a second version of the selected software model. The method 2000 at 2008 includes validating the second version of the selected software model via validation logic 27 by applying one or more versioning rules 29 to the second version of the selected software model. At 2010, the method 2000 includes, based on the application of the one or more versioning rules 29, executing a versioning action on the selected software model.

The method 2000 at 2012 may include the versioning action being based on a strict versioning approach, the strict versioning approach including that the software solution 23 is coded for specific software interface versions. Alternatively, the method 2000 at 2014 may include the versioning action being based on a relaxed versioning approach, the relaxed versioning approach including that the software solution 23 is coded for ranges of the software interface versions and the software solution 23 supports new software interface versions at runtime without additional code and/or configuration changes.

With reference now to FIG. 9B, at 2016, the method 2000 may include the selected software model being a software interface 14, the one or more versioning rules 29 including one or more of: no changes being made to the software interface 14 without increasing a version indicator; the second version of the software interface 14 including all capabilities included in the first version of the software interface 14; one or more capabilities can be added to the second version of the software interface 14; and schema changes to existing capabilities not being supported. At 2018, the method 2000 may include the selected software model being a capability model 13, the one or more versioning rules 29 including one or more of: no changes being made to the capability model 13 without increasing a version indicator; the second version of the capability model 13 including all software interfaces 14 included in the first version of the capability model 13; for all software interfaces 14 included in the first version of the capability model 13, the version indicator increasing respectively; one or more software interfaces 14 can be added to the second version of the capability model 13; and schema changes for name and type not being supported.

With reference now to FIG. 9C, at 2020, the method 2000 may include the validation logic 27 being executed in a model repository 25, the validation logic 27 including, where no prior versions of the selected software model are in the model repository 25, executing a create operation. At 2022, the method 2000 may include, where both a lower version of the selected software model and no higher versions of the selected software model are in the model repository 25, querying a highest version of the selected software model that is less than an input version of the selected software model and validating the input version of the selected software model according to the one or more versioning rules 29. At 2024, the method 2000 may include, where a higher version and no lower versions of the selected software model are in the model repository 25, querying a lowest version of the selected software model that is greater than the input version of the selected software model and validating the input version of the selected software model according to the one or more versioning rules 29. At 2026, the method 2000 may include, where both lower versions of the selected software model and higher versions of the selected software model are in the model repository 25, querying both the highest version of the selected software model that is less than the input version and the lowest version of the selected software model that is greater than the input version of the selected software model and validating the input version of the selected software model according to the one or more versioning rules 29.

In some embodiments, the methods and processes described herein may be tied to a computing system of one or more computing devices. In particular, such methods and processes may be implemented as an executable computer-application program, a network-accessible computing service, an application-programming interface (API), a library, or a combination of the above and/or other computer resources.

Figure 10:
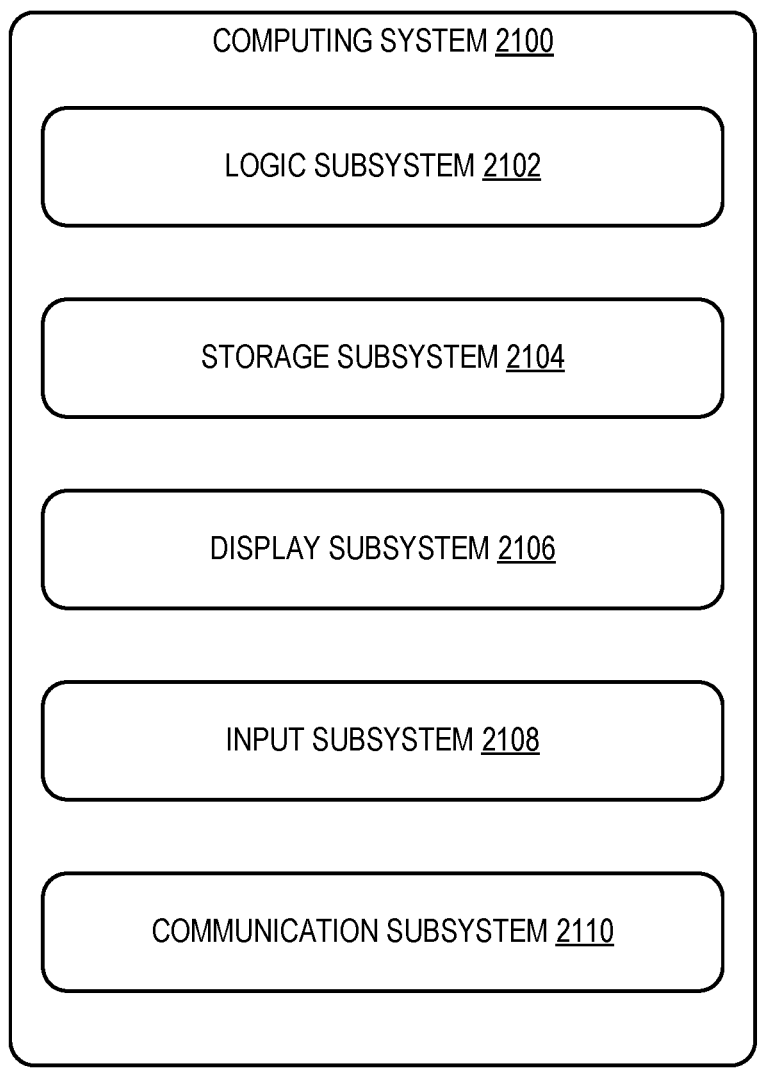
FIG. 10 shows a schematic view of an example computing environment in which the computing systems of FIG. 1 may be enacted.

FIG. 10 schematically shows a simplified representation of a computing system 2100 configured to provide any to all of the compute functionality described herein. Computing system 2100 may take the form of one or more personal computers, network-accessible server computers, Internet of Things (IoT) devices, tablet computers, home-entertainment computers, gaming devices, mobile computing devices, mobile communication devices (e.g., smart phone), wearable computing devices, embedded computing devices, and/or other computing devices.

Computing system 2100 includes a logic subsystem 2102 and a storage subsystem 2104. Computing system 2100 may optionally include a display subsystem 2106, input subsystem 2108, communication subsystem 2110, and/or other subsystems not shown in FIG. 10.

Logic subsystem 2102 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 2104 includes one or more physical devices configured to temporarily and/or permanently hold computer information such as data and instructions executable by the logic subsystem. When the storage subsystem includes two or more devices, the devices may be collocated and/or remotely located. Storage subsystem 2104 may include volatile, nonvolatile, dynamic, static, read/write, read-only, random-access, sequential-access, location-addressable, file-addressable, and/or content-addressable devices. Storage subsystem 2104 may include removable and/or built-in devices. When the logic subsystem executes instructions, the state of storage subsystem 2104 may be transformed—e.g., to hold different data.

Aspects of logic subsystem 2102 and storage subsystem 2104 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices. Machines may be implemented using any suitable combination of state-of-the-art and/or future machine learning (ML), artificial intelligence (AI), and/or natural language processing (NLP) techniques.

The terms "module," "program," and "engine" may be used to describe an aspect of computing system 2100 typically implemented in software by a processor to perform a particular function using portions of volatile memory, which function involves transformative processing that specially configures the processor to perform the function. Thus, a module, program, or engine may be instantiated via logic subsystem 2102 executing instructions held by storage subsystem 2104. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 2106 may be used to present a visual representation of data held by storage subsystem 2104. This visual representation may take the form of a graphical user interface (GUI) including holographic virtual objects. Display subsystem 2106 may include one or more display devices utilizing virtually any type of technology. In some implementations, display subsystem 2106 may include one or more virtual-, augmented-, or mixed reality displays.

When included, input subsystem 2108 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board.

Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 2110 may be configured to communicatively couple computing system 2100 with one or more other computing devices. Communication subsystem 2110 may include wired and/or wireless communication devices compatible with one or more different communication protocols. The communication subsystem may be configured for communication via personal-, local- and/or wide-area networks.

The following paragraphs provide additional support for the claims of the subject application. One aspect provides a computing system comprising a logic subsystem and memory storing instructions executable by the logic subsystem to store, in the memory, a plurality of software models that each describe aspects of a network connected device or a software service, the plurality of software models comprising a first version of a selected software model. The instructions are executable by the logic subsystem to receive a second version of the selected software model, validate the second version of the selected software model via validation logic by applying one or more versioning rules to the second version of the selected software model, and, based on the application of the one or more versioning rules, execute a versioning action on the selected software model.

In this aspect, additionally or alternatively, the logic subsystem may be further configured to execute the software service via a software solution configured to interact with the network connected device. The selected software model may integrate the network connected device with the software service.

In this aspect, additionally or alternatively, the versioning action may be based on a strict versioning approach, the strict versioning approach including that the software solution may be coded for specific software interface versions.

In this aspect, additionally or alternatively, the versioning action for the strict versioning approach may include outputting a breaking changes error for breaking changes to the selected software model that may include one or more of removing capabilities from software interfaces, removing software interfaces from capability models, and schema changes.

In this aspect, additionally or alternatively, the versioning action for the strict versioning approach may include, for a software solution coded for the first version of the selected software model and the network connected device supporting the second version of the selected software model, not maintaining added capabilities in the selected software model. The versioning action for the strict versioning approach may include, for the software solution coded for the first version of the selected software model and a software interface coded for the second version of the selected software model, outputting a property value error for property values in the selected software model. The versioning action for the strict versioning approach may include, for the software solution coded for the first version of the selected software model and the network connected device supporting both the first version and the second version of the selected software model, the software solution supporting only the first version of the selected software model.

In this aspect, additionally or alternatively, the versioning action may be based on a relaxed versioning approach, the relaxed versioning approach including that the software solution may be coded for ranges of software interface versions, and the software solution may support new software interface versions at runtime without additional code and/or configuration changes.

In this aspect, additionally or alternatively, the versioning action for the relaxed versioning approach may include outputting a breaking changes error for breaking changes to the selected software model that include one or more of removing capabilities from software interfaces, removing software interfaces from capability models, and schema changes.

In this aspect, additionally or alternatively, the versioning action for the relaxed versioning approach may include, for a software solution coded for the first version of the selected software model and the network connected device supporting the second version of the selected software model, maintaining capabilities in the selected software model for added capabilities. The versioning action for the relaxed versioning approach may include, for the software solution coded for the first version of the selected software model and a software interface coded for the second version of the selected software model, retrieving property values in the selected software model. The versioning action for the relaxed versioning approach may include, for the software solution coded for the first version of the selected software model and the network connected device supporting both the first version and the second version of the selected software model, the software solution supporting both the first version and the second version of the selected software model.

In this aspect, additionally or alternatively, the software solution may include one or more version agnostic application programming interfaces (APIs).

In this aspect, additionally or alternatively, the selected software model may be a software interface, and the one or more versioning rules may include one or more of: no changes are allowed to the software interface without increasing a version indicator; the second version of the software interface includes all capabilities included in the first version of the software interface; one or more capabilities can be added to the second version of the software interface; and schema changes to existing capabilities are not supported.

In this aspect, additionally or alternatively, the selected software model may be a capability model, and the one or more versioning rules may include one or more of: no changes are made to the capability model without increasing a version indicator; the second version of the capability model includes all software interfaces included in the first version of the capability model; for all software interfaces included in the first version of the capability model, the version indicator increases respectively; one or more software interfaces can be added to the second version of the capability model; and schema changes for name and type are not supported.

In this aspect, additionally or alternatively, the validation logic may be executed in a model repository, and the validation logic may include, where no prior versions of the selected software model are in the model repository, executing a create operation. The validation logic may include, where both a lower version of the selected software model and no higher versions of the selected software model are in the model repository, querying a highest version of the selected software model that is less than an input version of the selected software model and validating the input version of the selected software model according to the one or more versioning rules. The validation logic may include, where a higher version and no lower versions of the selected software model are in the model repository, querying a lowest version of the selected software model that is greater than the input version of the selected software model and validating the input version of the selected software model according to the one or more versioning rules. The validation logic may include, where both lower versions of the selected software model and higher versions of the selected software model are in the model repository, querying both the highest version of the selected software model that is less than the input version and the lowest version of the selected software model that is greater than the input version of the selected software model and validating the input version of the selected software model according to the one or more versioning rules.

Another aspect provides, enacted on a computing system, a method for versioning software models, the method comprising storing, in memory, a plurality of the software models that each describe aspects of a network connected device or a software service, the plurality of software models comprising a first version of a selected software model. The method comprises receiving a second version of the selected software model. The method comprises validating the second version of the selected software model via validation logic by applying one or more versioning rules to the second version of the selected software model. The method comprises, based on the application of the one or more versioning rules, executing a versioning action on the selected software model.

In this aspect, additionally or alternatively, the method may further comprise executing the software service via a software solution configured to interact with the network connected device. The selected software model may integrate the network connected device with the software service.

In this aspect, additionally or alternatively, the versioning action may be based on a strict versioning approach, the strict versioning approach including that the software solution may be coded for specific software interface versions.

In this aspect, additionally or alternatively, the versioning action may be based on a relaxed versioning approach, the relaxed versioning approach including that the software solution may be coded for ranges of software interface versions, and the software solution may support new software interface versions at runtime without additional code and/or configuration changes.

In this aspect, additionally or alternatively, the selected software model may be a software interface. The one or more versioning rules may include one or more of: no changes are made to the software interface without increasing a version indicator; the second version of the software interface includes all capabilities included in the first version of the software interface; one or more capabilities can be added to the second version of the software interface; and schema changes to existing capabilities are not supported.

In this aspect, additionally or alternatively, the selected software model may be a capability model. The one or more versioning rules may include one or more of: no changes are made to the capability model without increasing a version indicator; the second version of the capability model includes all software interfaces included in the first version of the capability model; for all software interfaces included in the first version of the capability model, the version indicator increases respectively; one or more software interfaces can be added to the second version of the capability model; and schema changes for name and type are not supported.

In this aspect, additionally or alternatively, the validation logic may be executed in a model repository, and the validation logic may include, where no prior versions of the selected software model are in the model repository, executing a create operation. The validation logic may include, where both a lower version of the selected software model and no higher versions of the selected software model are in the model repository, querying a highest version of the selected software model that is less than an input version of the selected software model and validating the input version of the selected software model according to the one or more versioning rules. The validation logic may include, where a higher version and no lower versions of the selected software model are in the model repository, querying a lowest version of the selected software model that is greater than the input version of the selected software model and validating the input version of the selected software model according to the one or more versioning rules. The validation logic may include, where both lower versions of the selected software model and higher versions of the selected software model are in the model repository, querying both the highest version of the selected software model that is less than the input version and the lowest version of the selected software model that is greater than the input version of the selected software model and validating the input version of the selected software model according to the one or more versioning rules.

Another aspect provides a computing system comprising a logic subsystem and memory storing instructions executable by the logic subsystem to store, in the memory, a plurality of software models that each describe (1) a software interface of either a network connected device or a software service, or (2) a capability model of either the network connected device or the software service. The plurality of software models comprises a first version of a selected software model including a first version indicator. The instructions are executable by the logic subsystem to receive a second version of the selected software model including a second version indicator, validate the second version of the selected software model via validation logic by applying one or more versioning rules to the second version of the selected software model, and, based on the application of the one or more versioning rules, execute a versioning action on the selected software model.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

As used herein, the phrase "and/or" means any or all of multiple stated possibilities.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed. If used herein, a phrase of the form "at least one of A and B" means at least one A or at least one B, without being mutually exclusive of each other, and does not require at least one A and at least one B. If used herein, the phrase "and/or" means any or all of multiple stated possibilities.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:
a logic subsystem; and
memory storing instructions executable by the logic subsystem to:
store, in the memory, a plurality of software models that each describe aspects of a network connected device or a software service, the plurality of software models comprising a first version of a selected software model;
receive a second version of the selected software model;
validate the second version of the selected software model via validation logic by applying one or more versioning rules to the second version of the selected software model;
based on an application of the one or more versioning rules, execute a versioning action on the selected software model; and
execute the software service via a software solution configured to interact with the network connected device, wherein the selected software model integrates the network connected device with the software service,
wherein the versioning action is based on either (1) a strict versioning approach including that the software solution is coded for specific software interface versions of the selected software model, or (2) a relaxed versioning approach including that the software solution is coded for ranges of software interface versions and the software solution supports new software interface versions at runtime without additional code and/or configuration changes.

2. The computing system of claim 1, wherein the versioning action for the strict versioning approach includes outputting a breaking changes error for breaking changes to the selected software model that include one or more of removing capabilities from software interfaces, removing software interfaces from capability models, and schema changes.

3. The computing system of claim 1, wherein the versioning action for the strict versioning approach includes:
for a software solution coded for the first version of the selected software model and the network connected device supporting the second version of the selected software model, not maintaining added capabilities in the selected software model;
for the software solution coded for the first version of the selected software model and a software interface coded for the second version of the selected software model, outputting a property value error for property values in the selected software model; and
for the software solution coded for the first version of the selected software model and the network connected device supporting both the first version and the second version of the selected software model, the software solution supporting only the first version of the selected software model.

4. The computing system of claim 1, wherein the versioning action for the relaxed versioning approach includes outputting a breaking changes error for breaking changes to the selected software model that include one or more of removing capabilities from software interfaces, removing software interfaces from capability models, and schema changes.

5. The computing system of claim 1, wherein the versioning action for the relaxed versioning approach includes:
for a software solution coded for the first version of the selected software model and the network connected device supporting the second version of the selected software model, maintaining capabilities in the selected software model for added capabilities;
for the software solution coded for the first version of the selected software model and a software interface coded for the second version of the selected software model, retrieving property values in the selected software model; and
for the software solution coded for the first version of the selected software model and the network connected device supporting both the first version and the second version of the selected software model, the software solution supporting both the first version and the second version of the selected software model.

6. The computing system of claim 1, wherein the software solution includes one or more version agnostic application programming interfaces (APIs).

7. The computing system of claim 1, wherein the selected software model is a software interface, and the one or more versioning rules include one or more of:
no changes are allowed to the software interface without increasing a version indicator;
the second version of the software interface includes all capabilities included in the first version of the software interface;
one or more capabilities can be added to the second version of the software interface; and
schema changes to existing capabilities are not supported.

8. The computing system of claim 1, wherein the selected software model is a capability model, and the one or more versioning rules include one or more of:
no changes are made to the capability model without increasing a version indicator;
the second version of the capability model includes all software interfaces included in the first version of the capability model;
for all software interfaces included in the first version of the capability model, the version indicator increases respectively;
one or more software interfaces can be added to the second version of the capability model; and
schema changes for name and type are not supported.

9. The computing system of claim 1, wherein the validation logic is executed in a model repository, and the validation logic includes:
where no prior versions of the selected software model are in the model repository, executing a create operation;
where both a lower version of the selected software model and no higher versions of the selected software model are in the model repository, querying a highest version of the selected software model that is less than an input version of the selected software model and validating the input version of the selected software model according to the one or more versioning rules;

where a higher version and no lower versions of the selected software model are in the model repository, querying a lowest version of the selected software model that is greater than the input version of the selected software model and validating the input version of the selected software model according to the one or more versioning rules; and where both lower versions of the selected software model and higher versions of the selected software model are in the model repository, querying both the highest version of the selected software model that is less than the input version and the lowest version of the selected software model that is greater than the input version of the selected software model and validating the input version of the selected software model according to the one or more versioning rules.

10. Enacted on a computing system, a method for versioning a plurality of software models, the method comprising:

storing, in memory, the plurality of the software models that each describe aspects of a network connected device or a software service, the plurality of the software models comprising a first version of a selected software model;

receiving a second version of the selected software model;

validating the second version of the selected software model via validation logic by applying one or more versioning rules to the second version of the selected software model;

based on an application of the one or more versioning rules, executing a versioning action on the selected software model; and executing the software service via a software solution configured to interact with the network connected device, wherein the selected software model integrates the network connected device with the software service, and wherein the versioning action is based on either (1) a strict versioning approach including that the software solution is coded for specific software interface versions of the selected software model, or (2) a relaxed versioning approach including that the software solution is coded for ranges of software interface versions and the software solution supports new software interface versions at runtime without additional code and/or configuration changes.

11. The method of claim 10, wherein
the selected software model is a software interface, and
the one or more versioning rules include one or more of:
no changes are made to the software interface without increasing a version indicator;
the second version of the software interface includes all capabilities included in the first version of the software interface;
one or more capabilities can be added to the second version of the software interface; and
schema changes to existing capabilities are not supported.

12. The method of claim 10, wherein
the selected software model is a capability model, and
the one or more versioning rules include one or more of:
no changes are made to the capability model without increasing a version indicator;
the second version of the capability model includes all software interfaces included in the first version of the capability model;
for all software interfaces included in the first version of the capability model, the version indicator increases respectively;
one or more software interfaces can be added to the second version of the capability model; and
schema changes for name and type are not supported.

13. The method of claim 10, wherein the validation logic is executed in a model repository and the validation logic includes:

where no prior versions of the selected software model are in the model repository, executing a create operation;

where both a lower version of the selected software model and no higher versions of the selected software model are in the model repository, querying a highest version of the selected software model that is less than an input version of the selected software model and validating the input version of the selected software model according to the one or more versioning rules;

where a higher version and no lower versions of the selected software model are in the model repository, querying a lowest version of the selected software model that is greater than the input version of the selected software model and validating the input version of the selected software model according to the one or more versioning rules; and where both lower versions of the selected software model and higher versions of the selected software model are in the model repository, querying both the highest version of the selected software model that is less than the input version and the lowest version of the selected software model that is greater than the input version of the selected software model and validating the input version of the selected software model according to the one or more versioning rules.

14. A computing system, comprising:
a logic subsystem; and
memory storing instructions executable by the logic subsystem to:
store, in the memory, a plurality of software models that each describe (1) a software interface of either a network connected device or a software service, or (2) a capability model of either the network connected device or the software service, wherein the plurality of software models comprises a first version of a selected software model including a first version indicator;
receive a second version of the selected software model including a second version indicator;
validate the second version of the selected software model via validation logic by applying one or more versioning rules to the second version of the selected software model;
based on an application of the one or more versioning rules, execute a versioning action on the selected software model; and
execute the software service via a software solution configured to interact with the network connected device, wherein the selected software model integrates the network connected device with the software service, and wherein the versioning action is based on either (1) a strict versioning approach including that the software solution is coded for specific software interface versions of the selected software model, or (2) a relaxed versioning approach including that the software solution is coded for ranges of software interface versions and the software solution supports new software interface versions at runtime without additional code and/or configuration changes.

* * * * *